Figure 1:
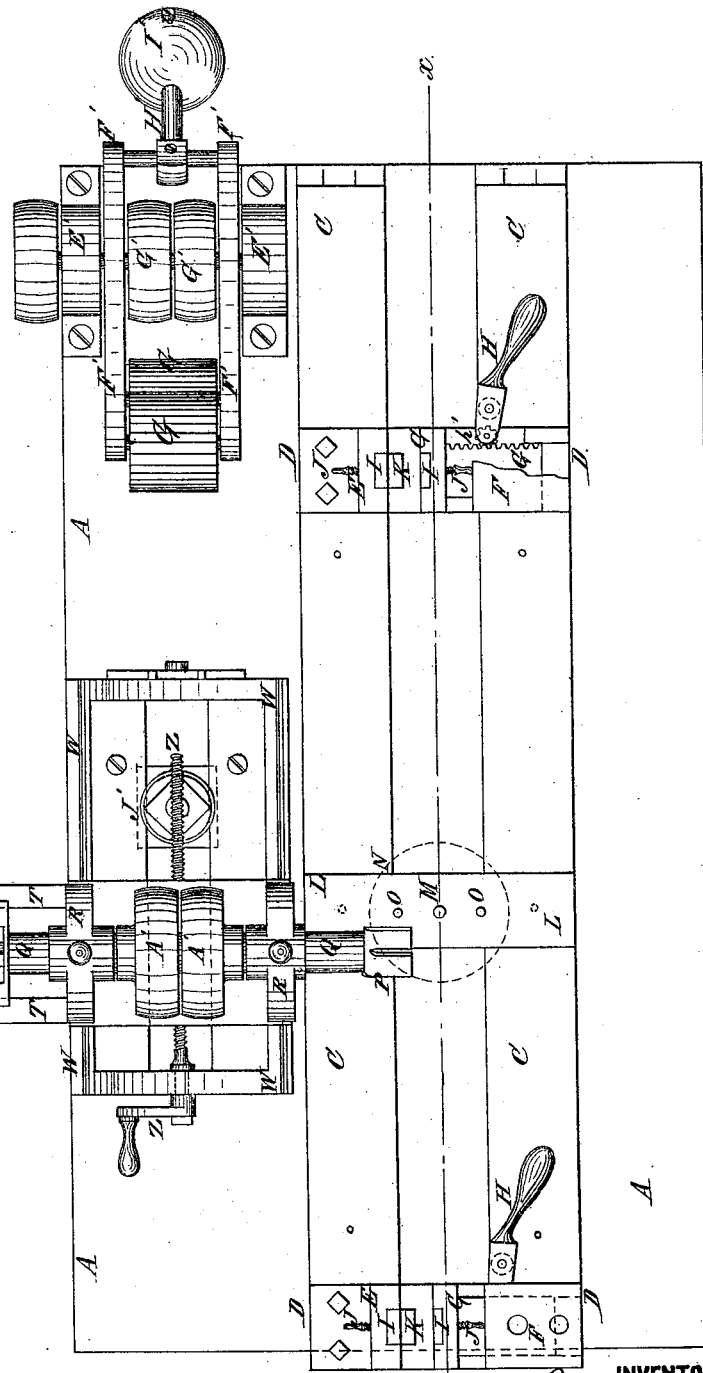

2 Sheets—Sheet 1.

J. DICKENS.
MACHINES FOR BORING FENCE POSTS.

No. 179,534. Patented July 4, 1876.

WITNESSES:
H. Rydquist
John Goethals

INVENTOR:
John Dickens
BY
Munn
ATTORNEYS.

N. PETERS, PHOTO-LITHOGRAPHER, WASHINGTON, D.C.

2 Sheets—Sheet 2.
J. DICKENS.
MACHINES FOR BORING FENCE POSTS.
No. 179,534. Patented July 4, 1876.
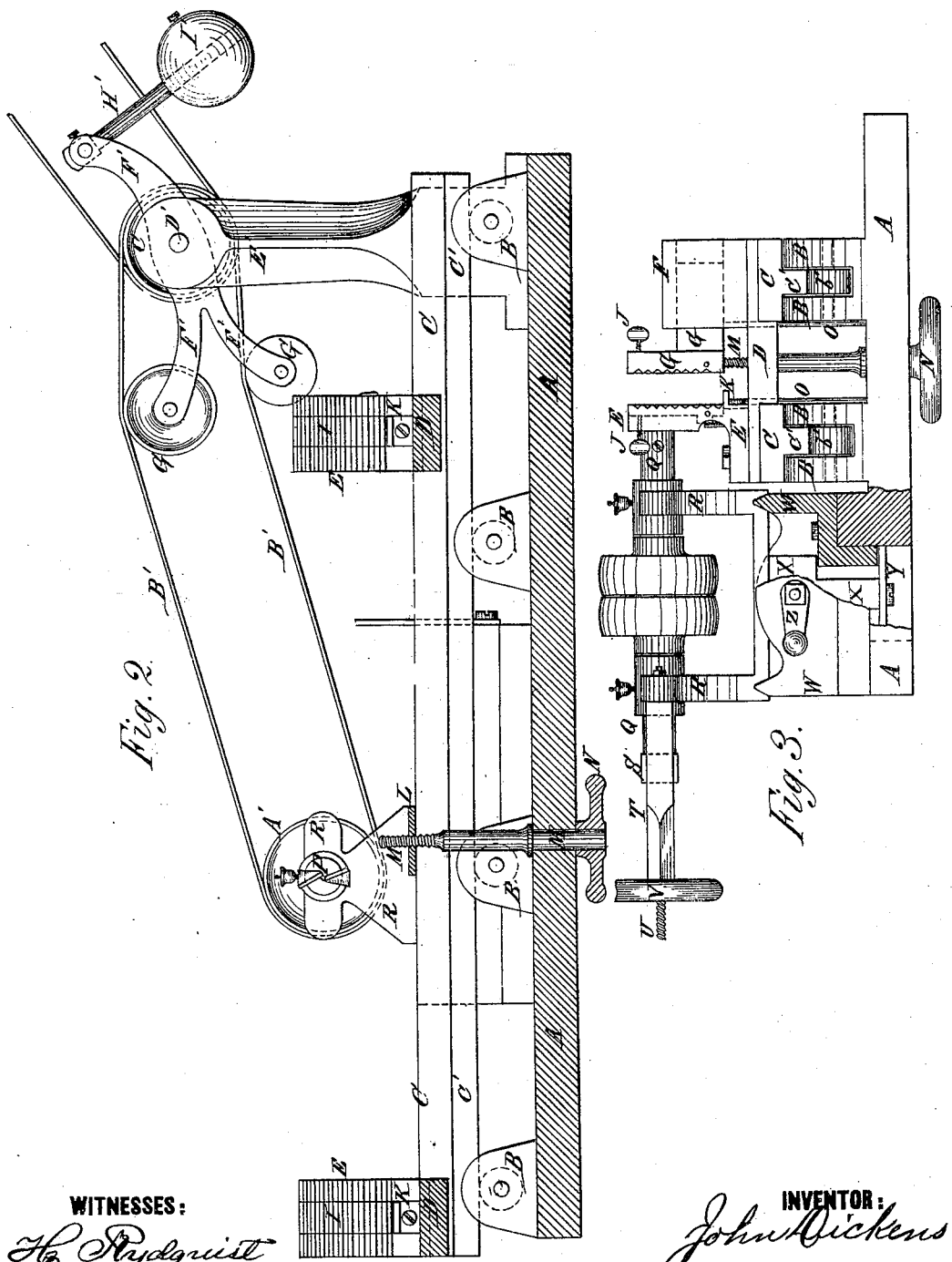

UNITED STATES PATENT OFFICE.

JOHN DICKENS, OF KINGSTON, NEW JERSEY, ASSIGNOR TO HIMSELF AND GEORGE R. KELLY, OF SAME PLACE.

IMPROVEMENT IN MACHINES FOR BORING FENCE-POSTS.

Specification forming part of Letters Patent No. 179,534, dated July 4, 1876; application filed April 25, 1876.

*To all whom it may concern:*

Be it known that I, JOHN DICKENS, of Kingston, in the county of Middlesex and State of New Jersey, have invented an Improvement in Machines for Boring Holes in Fence-Posts, of which the following is a specification:

Figure 1, Sheet 1, is a top view of my improved machine, part being broken away to show the construction. Fig. 2, Sheet 2, is a vertical longitudinal section of the same, taken through the line $x$ $x$, Fig. 1. Fig. 3, Sheet 2, is an end view of the same, part being broken away to show the construction.

The object of this invention is to furnish a machine for boring holes in fence-posts, which shall be simple in construction, convenient in use, and effective in operation, enabling the holes to be bored rapidly and accurately.

The invention consists in combining a swiveled screw-table having pins, a clamp-bar having points on its under side, and bars having holes for said points, as hereinafter more particularly described.

A represents the table or bench of the machine, which is supported upon legs or a frame to raise it to a convenient height. To the table A are attached two rows of blocks, B, which are slotted to receive the tongue $c'$, formed upon the lower sides of the bars C of the carriage, and which have friction-rollers $b'$ pivoted in them for the said tongues $c'$ to rest and move upon. The bars C of the carriage are connected by cross-bars D, to one end of each of which is attached the stationary jaws E of the vise. To the other end of the bars D is bolted a socket, F, to receive the shank of the movable jaw G. Upon one side of the shank of the movable jaws G are formed teeth to receive the teeth of the small gear-wheels $h'$, pivoted to the ends of the small levers H, which are pivoted to the bars C, and by which the said movable jaws are locked after being pushed forward into place. The faces of the jaws E G have vertical grooves or recesses formed in them to receive the small plates I, which are pivoted at their lower ends to enable their upper ends to be forced forward by hand-screws J, passing through screw-holes in the said jaws, to fit against the sides of the posts. The posts rest upon the upper parts of the angle-plates K, the lower parts of which are bolted to the lower posts of the stationary jaws E, and are slotted to enable them to be moved up and down by loosening the said bolts to adjust them to the size of the posts. The carriage is secured in place by the clamp bar or plate L, through the center of which the screw M passes, and is swiveled to the table A, and has a hand-wheel, N, attached to its lower end, below the said table A. The clamp-bar L moves up and down upon guide-pins O, attached to the table A, and which pass through holes formed in the said clamp-bar. Upon the under side of the clamp-bar L are formed points, which enter holes in the bars C of the carriage to center said carriage when adjusting it. P is the cutting-tool, which is attached to the inner end of the spindle Q. The spindle Q revolves in bearings in the carriage R, and its outer end is swiveled to a cross-head, S, which slides upon a frame, T, attached to the outer side of the carriage R. To the cross-head S is attached the end of a screw, U, which passes through a hand-nut, V, swiveled to the outer end of the frame T, so that by turning the nut V in one direction the cutter P will be fed forward to bore a hole in the post, and by turning it in the other direction the cutter will be withdrawn from the post. The carriage R rests and slides upon the box W, attached to the table A, and has an arm, X, attached to its bottom, which passes down through a slot in the bottom of the box W, and has a plate, Y, attached to its lower end, which rests against and slides upon the lower side of the said bottom to hold the said carriage in its place. Z is a crank-screw, which is swiveled to the end of the box W, and passes through a screw-hole in the arm X, so that by turning the said screw the cutter may be moved laterally to cut the slot in the post.

When the slot in the post has been cut to the desired length, the carriage R is stopped by striking against a stop, J', secured adjustably in the slot in the bottom of the box W. To the spindle Q is attached a fast and a loose pulley, A', to receive the belt B', which passes around a pulley, C', attached to the shaft D'. The shaft D' revolves in brackets E', attached to the table A, and to it is attached a pulley or gear-wheel to receive the power. To the shaft D', upon the opposite sides of the pulley C', is hung a frame, F', the forward end of which is forked, and has idler-pulleys G' pivoted to its branches, to receive the upper and lower parts of the belt B', and act as idlers to keep the said belt taut as the carriage R is moved back and forth.

To the rear end of the frame F' is adjustably attached an arm, H', to which is adjustably attached a weight, I', so that by adjusting the arm H' and weight I' the idlers G' may be pressed against the belt B' with greater or less force, to give any desired tautness to said belt.

Having thus described my invention, what I claim as new, and desire to secure by Letters Patent, is—

The carriage adjusted to the table of a boring-machine by a clamping-bar, L, swiveled screw M, and pins O O, arranged substantially as shown and described.

JOHN DICKENS.

Witnesses:
GEORGE ROBERT KELLY,
WILLIAM I. BASTEDO.